United States Patent Office

3,629,150
Patented Dec. 21, 1971

3,629,150
PROCESS FOR MAKING ISOBUTENE POLYMERIZATION CATALYST FROM SILICA, ALUMINUM ALKYL AND A HALIDE
Leslie Ernest Addy, Dollar, Scotland, assignor to BP Chemicals (U.K.) Limited, London, England
No Drawing. Filed June 2, 1969, Ser. No. 829,762
Claims priority, application Great Britain, May 31, 1968, 26,100/68
Int. Cl. B01j *11/78*
U.S. Cl. 252—442                                 15 Claims

ABSTRACT OF THE DISCLOSURE

Catalysts suitable for polymerizing isobutene are made by reacting, under substantially anhydrous conditions, dehydrated silica having silanol groups with aluminium alkyl, and then with a hydrogen halide or an alkylhalide.

---

The present invention relates to novel catalytic compositions and to a method of making them. It is known to use aluminium trichloride to polymerize isobutene to give polymers which range from liquids to elastic solids. The use of aluminium trichloride presents some difficulties however, for example in separating the aluminium trichloride completely from the reaction product.

We have now found an improved method of polymerizing isobutene and for the preparation of suitable catalysts.

The present invention is a process for making catalytic compositions suitable for the polymerization of isobutene which comprises carrying out under substantially anhydrous conditions the successive steps of reacting dehydrated silica having silanol groups with an aluminium alkyl and thereafter reacting the resulting treated silica with a hydrogen halide or an alkyl halide.

The present invention is also a process for the polymerization of isobutene which comprises bringing isobutene in the liquid phase into contact with a catalyst comprising silica having aluminium chloride moieties bound through aluminium to oxygen bonds to the surface of the silica.

By "aluminium chloride moiety" is meant the unit which remains after at least one of the chlorine atoms of aluminium chloride, whether in the form of the single molecule $AlCl_3$ or the dimer $Al_2Cl_6$ is replaced by an aluminium to oxygen bond. Thus the aluminium chloride moiety may be $-AlCl_2$, $>AlCl_2AlCl_3$, or $>AlClAlCl_3$.

The term "polymerization" as used in this specification includes both the production of higher molecular weight viscous or semi-solid materials as well as the production of oligomers.

The silica which is used as a starting material in the preparation of catalytic compositions in accordance with the present invention contains silanol groups, i.e. it contains the group $\rightarrow SiOH$. This group will be found on the surface of the silica to which it is bound by the remaining valencies of the silicon in the silanol group.

The silica which is used as the starting material for the process of the present invention must also be a dehydrated silica, i.e. a silica from which at least most of the free water (including adsorbed water) has been removed. While the silica must contain silanol groups it is preferred to prepare the dehydrated silica from a silica containing silanol groups by dehydrating it sufficiently to remove not only the free water but also some proportion of the water combined in e.g. silanol groups. By this means control over the density of the active sites on the catalyst surface can be achieved.

The dehydration may be carried out in any convenient manner. Thus when the silica is in the form of particles of size suitable for fluidisation, the silica may be fluidised in a hot gas stream.

Examples of suitable starting materials for the process of the present invention are silica gels which have been dehydrated by heating at temperatures in the range 150° C. to 900° C., preferably at temperatures in excess of 200° C. in particular temperatures in excess of 250° C. A preferred temperature range is 300–400° C. The duration of the heating may be in the range 0.1 hour to 100 hours e.g. 2 to 6 hours, depending on the temperature used and on the degree of dehydration aimed at but in any case must be controlled so as not to destroy all the silanol groups. The silica which is dehydrated to give the desired starting product may be any silica containing silanol groups, but is preferably a silica gel i.e. a silica hydrogel or silica aerogel, of surface area exceeding about 50 square metres per gram, for example a gel having a surface area of about 500–700 m.$^2$/g.

Examples of suitable aluminium alkyls with which the dehydrated silica may be reacted are the aluminium trialkyls, e.g. aluminium triethyl, aluminium tri-isobutyl. Aluminium halo-alkyls of the type $Al(C_2H_5)_2Cl$ and $Al(C_2H_5)Cl_2$ and aluminium alkyl hydrides may also be used. It is preferred to use aluminium alkyls in which the alkyl groups have from one to ten, preferably one to four carbon atoms in each alkyl group.

The aluminium alkyl may be reacted with the silanol groups on the silica by being brought into contact with the dehydrated silica. This may be conveniently carried out by dissolving the aluminium alkyl in a thoroughly dried inert solvent, e.g. a lower alkane or cycloalkane having for example 3 to 20 preferably 5 to 12 carbon atoms per molecule and mixing the solution with the silica. Aromatic solvents may be used. Alternatively the reaction may be carried out in the gas phase by entraining the aluminium alkyl in a dry inert gas stream which may be passed over a fixed bed of silica or into a fluidized bed of silica. The silica and aluminium alkyl may be brought into contact over a moderately wide range of temperatures e.g. temperatures in the range $-50°$ to $+150°$ C. but it may be desirable to avoid too high a temperature to prevent undesirable side reactions. The reaction is exothermic and it is desirable to prevent too great a rise in the temperature of the silica. It is preferred to keep the silica at a temperature within the range 20° C. to 100° C., preferably 20° C. to 50° C. Control of the temperature may be achieved by for example carrying out the reaction in the presence of a solvent which is allowed to evaporate, carrying off the heat of the reaction, and the lower alkanes (butanes, pentanes and hexanes) and cycloalkanes are very suitable solvents for this purpose. The duration of the reaction with the aluminium alkyl may vary over a moderately wide range, for example between 0.1 hour and 24 hours.

The maximum quantity of aluminium alkyl which reacts with the silica is determined by the hydroxyl content of the silica used, which may be determined by the well known Zerewitinoff method. The quantity of aluminium alkyl fed into contact with the silica may vary over a moderately wide range for example the ratio of moles of aluminium alkyl to gram atoms of hydrogen forming part of silanol groups brought into contact may be up to 3:1. The ratio of moles of aluminium alkyl to gram atoms of hydrogen in silanol groups brought into contact may be as low as 0.2:1. The quantity of aluminium alkyl fed into contact with the silica is preferably not more than the stoichiometric proportion relative to the hydroxyl groups present i.e. one mole of aluminium alkyl per gram atom of hydrogen forming part of a silanol group. Not all the aluminium alkyl brought into contact with the silica necessarily reacts so that an excess of aluminium alkyl may result in a ratio of moles of aluminium alkyl reacted to gram atoms of hydrogen forming part of silanol groups of less than 1:1. Even the ratio of moles of aluminium alkyl *added to* gram atoms of hydrogen forming part of silanol groups is less than 1:1 unreacted aluminium alkyl may remain on the catalyst. When this occurs it is preferred to wash any surplus aluminium alkyl from the silica with a suitable solvent e.g. pure dry cyclohexane. The ratio of moles of aluminium alkyl to gram atoms of hydrogen forming part of silanol groups which actually react together is preferably from 0.8:1 to 1:1.

It will be realized that any surplus aluminium alkyl will be converted by reaction with hydrogen halide or alkyl halide into aluminium trichloride.

The type of polymer obtained appears to be affected by the quantity of aluminium alkyl brought into contact with the silica. The use of low molar ratios of aluminium alkyl to g. atoms of hydrogen in silanol groups, e.g. 0.02:1 to 0.8:1 gave a high proportion of light polymer i.e. low molecular weight polymer. The use of higher ratios of aluminium alkyl to surface hydroxyl groups, e.g. 1:1 to 3:1 gave higher yields of heavy polymer i.e. higher molecular weight polymer.

The aluminium alkyl may be reacted with the silica in more than one stage, a quantity of aluminium alkyl being brought into contact with the silica and allowed to react to completion. The product may then be hydrolysed to generate further hydroxyls before a further quantity of aluminium alkyl is added to produce a second product, for reaction with hydrogen halide.

The concentration of the aluminium alkyl in the medium brought into contact with the silica may be varied to control the nature of the active sites and thus the behaviour of the catalyst. Thus it is believed that the formation of sites of the type

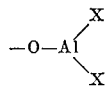

where X is halogen, is favoured by concentrated solutions of aluminium alkyls followed by reaction with hydrogen halide or alkylation, while the formation of sites of the type

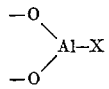

where X is halogen, is favoured by dilute solutions of aluminium alkyls followed by reaction with hydrogen halide or alkyl halide. By using different concentrations of aluminium alkyls the relative proportion of the two types of sites can be controlled. Alternatively the silica can be reacted with concentrated aluminium alkyl solutions, the resulting product hydrolyzed and then reacted with dilute solutions of aluminium alkyls. By this means it is believed that catalytic sites consisting almost wholly of the type Al—X, where X is halogen, can be obtained.

When the aluminium alkyl has reacted with the silica to the desired extent, and, if required, any surplus aluminium alkyl has been washed off, the treated silica is then reacted with a hydrogen halide or an alkyl halide to replace the alkyl groups remaining on the aluminium atom, which is now bonded to the silica. It should be noted that although the reaction is stated to be between the halide and the treated silica it is believed that the reaction is with aluminium alkyl groups bonded to the sliica. An example of a suitable hydrogen halide is hydrogen chloride, while examples of suitable alkyl halides are the lower alkyl halides, e.g. those having less than 10 carbon atoms in the molecule and preferably less than 5 carbon atoms in the molecule. Tertiary halides, e.g. tertiary butyl chloride are preferred. The reaction may be carried out by bringing the treated silica into contact with the hydrogen halide which may be in the gaseous or liquid phase. The reaction is exothermic and it may be desirable to dilute the hydrogen halide with an inert diluent to prevent too great a rise in the temperature of the silica. Thus when hydrogen chloride gas is reacted with the treated silica, it may be mixed with an inert gas, e.g. nitrogen. It is preferred however, whether using hydrogen halides or alkyl halides, to bring the halide into contact with the silica in the form of a solution in a solvent which is inert under the conditions of the halide treatment, for example paraffins e.g. $C_{10}$–$C_{13}$ paraffins or n-pentane. Where hydrogen halide is used as a solution, the hydrogen halide may be fed as a gas to the silica, the silica being suspended in the solvent. It may be desirable to control the rate at which the halide and the treated silica alkyl react by controlling the rate at which the halide and silica are brought into contact. This may be done by feeding the halide preferably in a diluent, gradually into contact with the silica. Thus the silica may be fluidised and a stream of the inert gas, e.g. nitrogen, to which hydrogen chloride gas is added (which of course should be substantially free of water) or a solution of alkyl chloride in a solvent may be added gradually to the silica.

The quantity of halide fed is most desirably sufficient to react with all the alkyl groups bonded to the aluminium on the silica and halide is thus fed until no more reacts. The time necessary to obtain complete reaction may vary somewhat depending on the temperature and the rate at which the halide is fed but may for example be between 10 minutes to 2 hours.

The reaction with the halide is generally quite rapid, and the rate of halide addition determined by the necessity to prevent the temperature rising too high, e.g. not over about 250° C. preferably not over 200° C. The temperature at which the halide and silica are brought into contact may vary over a moderately wide range, for example from 0 to 250° C.

The product obtained after the treatment with the halides may be used for example to catalyze the liquid phase polymerization of isobutene which may be carried out batchwise or continuously. It will be noted that no additional component such as a transition metal halide is required to obtain satisfactory results. The isobutene may be fed to the polymerisation reaction alone or mixed with other hydrocarbons. Thus a $C_4$ hydrocarbon mixture may be used which may contain n- and iso-butanes, n-butenes and butadiene in addition to isobutene.

The reaction may be carried out at temperatures in the range —50° C. to 200° C. The pressure is not critical provided it is sufficient to keep the isobutene in the liquid phase. The duration of the reaction may vary over a moderately wide range and examples of suitable times are 1 minute to 5 hours.

Where the catalyst is in particle form it may be brought into contact with the isobutene by suspending the catalyst in the reaction mixture which may contain an inert solvent. The catalyst may be kept in suspension by agitating the reaction mixture, or by rapid internal recycle of hydrocarbon through the reactor.

The polymer may be recovered from the reaction mixture by separating the catalyst from the total reaction product and then distilling off unreacted isobutene and solvent from the polymer. Thus the catalyst may be removed by allowing it to settle out and it is desirable that the catalyst should be in a form and have a particle size such that it is readily separated from the polymer. This may be achieved by selecting a silica for the preparation of the catalyst which has the desired properties. After the catalyst has settled out the unreacted isobutene and other low boiling material may be evaporated off, preferably under reduced pressure to leave a residue of polymer.

The invention will now be illustrated by the following examples.

EXAMPLE 1

A quantity of Davison microspheroidal silica gel (Grade 968) was fluidised in a tube in a stream of air, and heated at 350° C. for 4 hours. The product (38 g.) was stirred in pentane with 20 ml. of aluminium triethyl, with which a rapid exothermic reaction took place, the heat being removed by boiling pentane, which was condensed and returned to the reactor. The pentane was evaporated after reaction was complete and the solid product charged to the tube previously used to heat it in air and fluidised in a stream (500 ml./min.) of dried nitrogen at ambient temperature. Dry gaseous hydrogen chloride was added to the fluidising nitrogen stream, which led to an exothermic reaction with the solid. This continued for one hour, when hydrogen chloride was detected in the nitrogen leaving the treated silica. The hydrogen chloride was then cut off and the catalyst cooled in the nitrogen stream.

A portion of the solid so made (3.5 g.) was stirred with 20 g. of dried pentane in a stirred reactor fitted with a refrigerated condenser. A $C_4$ hydrocarbon stream of the following composition was added:

| | Mole percent |
|---|---|
| Isobutane | 1.2 |
| n-Butane | 8.8 |
| Butene-1 | 27.2 |
| Butene-2 | 15.2 |
| Isobutene | 46.9 |
| Butadiene | 0.7 | and the mixture stirred, the heat of polymerization being removed by boiling off the hydrocarbon, which was condensed and returned to the reaction. Reaction was continued for 30 minutes, after which the catalyst was allowed to settle and the hydrocarbon removed. Pentane and unreacted $C_4$ hydrocarbons were removed from the hydrocarbon layer by evacuating at room temperature. A residue (36.3 g.) of water white viscous polymer (viscosity by method ASTM D 445–61 was 9,800 SSU at 210° F.) was so obtained.

EXAMPLE 2

The silica gel after treatment with aluminium triethyl as in Example 1 was added (38 g.) to dry pentane, and t-butyl chloride (9.8 g.) dissolved in its own volume of pentane added dropwise with stirring over 10 minutes. The pentane boiled during this operation, and some gas was evolved. After completion of the reaction pentane was evaporated in a stream of dry nitrogen, and 3.2 g. of the solid so obtained was slffiurried in 23 g. of dry pentane and 131 g. of the $C_4$ hydrocarbon of the composition shown in Example 1 added with stirring and reflux. After 30 minutes reaction, stirring was stopped, the catalyst allowed to settle, and the hydrocarbon decanted from the catalyst. Evaporation under vacuum gave 26.5 g. of viscous polymer.

A repeat polymerisation on the same charge of catalyst gave 33.7 g. of viscous polymer from 148.5 g. of $C_4$ feedstock. The polymer was pale yellow in colour and had a viscosity in excess of 10,000 SSU at 210° F. (Method ASTM D 445–61).

EXAMPLE 3

1.9 g. silica gel was reacted with aluminium triethyl in pentane solution using a molar ratio of $AlEt_3$ to surface hydroxyl groups of 0.5:1.

This catalyst in pentane was treated with gaseous hydrochloride and used to polymerise a mixed butene feed. The product (278 g.) on distillation gave 21.5% w./w. of viscous polymer having a viscosity of 2,380 SSU.

EXAMPLE 4

Silica gel was reacted with aluminium triethyl in pentane solution using a molar ratio of $AlEt_3$ to surface hydroxyl groups of 2:1.

Catalyst was washed free of unreacted aluminium alkyl with pentane solution and then treated with gaseous hydrogen chloride. 2.5 g. of this catalyst when used to polymerise a mixed butene feed gave 137 g. product which on distillation gave 49.6% of viscous polymer having a viscosity of 15,600 SSU.

EXAMPLE 5

Silica gel was reacted with aluminium alkyl using a molar ratio of aluminium alkyl to surface hydroxyl groups of 3:1, the unreacted aluminium alkyl being washed from the catalyst. 4.66 g. $SiO_2$ reacted with 0.0328 gram mole of $AlEt_3$ and evolved 0.0196 gram mole of ethane. This treated silica chloride was reacted with gaseous hydrogen chloride and 1.7 g. of this product converted 151 gm. of mixed butene feed to polymer.

I claim:
1. A process for making a catalytic composition suitable for the polymerization of isobutene which comprises carrying out under substantially anhydrous conditions the successive steps of reacting at a temperature in the range of −50° C. to 150° C. dehydrated silica having silanol groups with an aluminum alkyl to give a treated silica, the ratio of moles of aluminum alkyl to gram atoms of hydrogen forming part of silanol groups brought into contact being not less than 0.2:1 and not more than 3:1, and reacting the resulted treated silica with a hydrogen halide or an alkyl halide at a temperature of from 0° to 250° C. to halogenate the treated silica and any unreacted or surplus alkyl aluminum present.
2. The process according to claim 1 wherein the silica is washed with a solvent for the aluminium alkyl after the dehydrated silica has been reacted with the aluminium alkyl.
3. The process according to claim 1 wherein the ratio of moles of aluminum allyl to gram atoms of hydrogen forming part of silanol groups brought into contact is in the range 0.2:1 to 1:1.
4. The process according to claim 1 wherein the dehydrated silica has a surface area exceeding 50 m.²/g.
5. The process according to claim 1 wherein the dehydrated silica is prepared by heating silica to a temperature in the range of 150° C. to 900° C.
6. The process according to claim 5 wherein the silica is heated to a temperature in excess of 250° C.
7. The process according to claim 1 wherein the aluminium alkyl has from 1 to 4 carbon atoms in each alkyl group.
8. The process according to claim 7 wherein the aluminium alkyl is aluminium triethyl.
9. The process according to claim 1 wherein the temperature is in the range 20 to 50° C.
10. The process according to claim 1 wherein the aluminum alkyl is brought into contact with the silica in solution in a dried inert solvent selected from alkanes or cycloalkanes having 3 to 20 carbon atoms in the molecule.
11. The process according to claim 1 wherein the treated silica is reacted with hydrogen chloride.
12. The process according to claim 1 wherein the alkyl halide is selected from tertiary halides having less than 5 carbon atoms per molecule.
13. The process according to claim 12 wherein the halide is tertiary butyl chloride.
14. The process according to claim 1 wherein the hydrogen halide or alkyl halide is fed in a diluent into contact with the silica.
15. The process according to claim 1 wherein the silica is suspended in a solvent and the hydrogen halide is fed as a gas into contact with the solvent.

References Cited

UNITED STATES PATENTS

| 2,999,074 | 9/1961 | Bloch et al. | 252—441 X |
| 3,202,645 | 8/1965 | Yancey | 252—441 X |
| 3,274,120 | 9/1966 | Aftandilian | 252—441 X |
| 3,427,254 | 2/1969 | Muller et al. | 252—442 X |

PATRICK P. GARVIN, Primary Examiner

U.S. Cl. X.R.

252—429, 442; 260—683.15, 94.8